July 3, 1945. W. SCHMITZ 2,379,660
TROLLING SPOON
Filed June 8, 1944
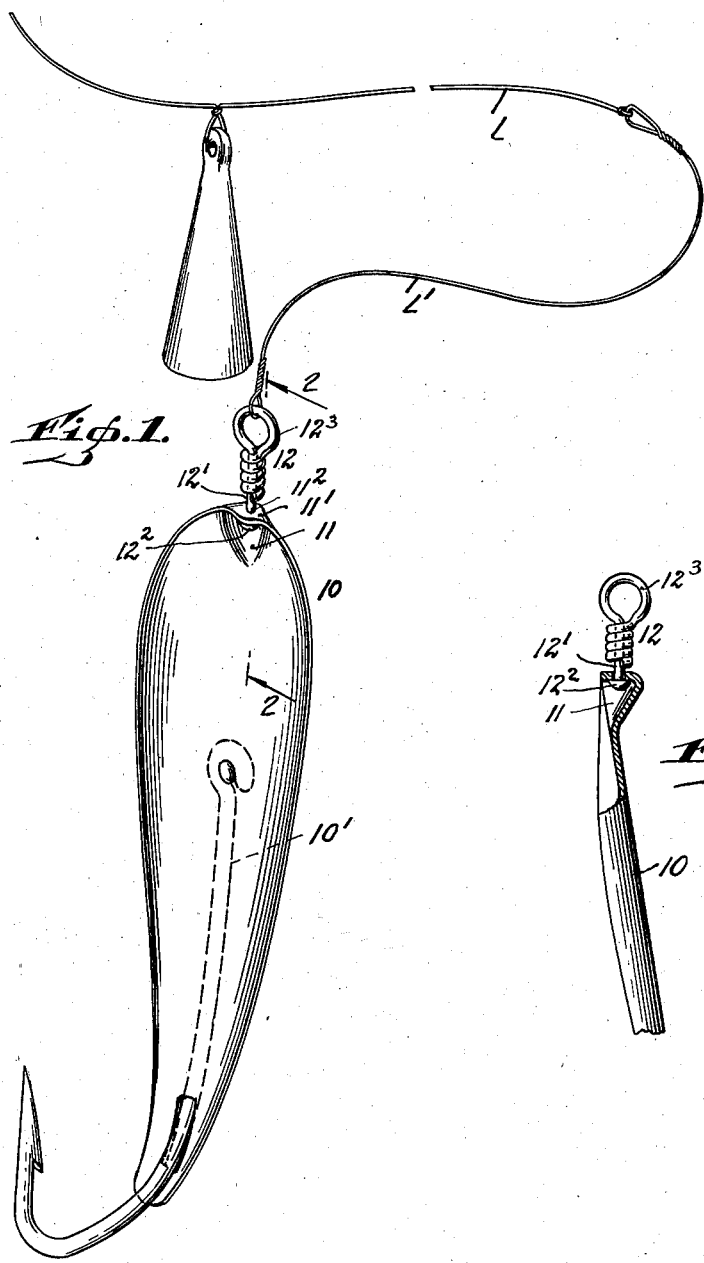
INVENTOR.
William Schmitz
BY
Mac V. Ordmann
ATTORNEY.

Patented July 3, 1945

2,379,660

UNITED STATES PATENT OFFICE 2,379,660

TROLLING SPOON

William Schmitz, Miami, Fla.

Application June 8, 1944, Serial No. 539,253

2 Claims. (Cl. 43—45)

The present invention relates to fishing tackle, more specifically to trolling spoons. The pitching and rolling of trolling spoons cast on a long line and causing the latter to become twisted and entangled, make it necessary to employ swivel joints between the spoon and the line, or between the line and the leader, or both. But the attachment of such swivel joints as separate parts, as hitherto used, has been found to be objectionable for many reasons. First, such parts, to suit the particular purpose, especially in these times, are not always available, and are quite expensive. Secondly, the attachment of said parts is generally done by means of wires, rings or similar means, which easily become loose, requiring frequent re-tightening or replacement of parts, and often even result in the loss of a good catch. Moreover, the attachment wires or rings, when loosened, themselves cause entanglement of the line, thus defeating the purpose of the swivel joints.

To obviate these objections, I provide a trolling spoon with a built-in swivel member, that is, a spoon in which the swivel member is made a permanent part thereof. This swivel member may be of any suitable construction and material and may be permanently joined to the spoon in any suitable manner. In the present embodiment, I have shown the spoon formed in the center of its forward end with a shallow depression or cavity constituting a socket, in which a member serving for the attachment of the line or leader is permanently secured so that it is capable of swiveling therein and thereby of dispensing with the necessity of employing any separate swivels.

In the accompanying drawing, which constitutes part of this specification and in which similar reference characters denote corresponding parts:

Figure 1 is a perspective view of the trolling spoon, made in accordance with my invention, and Figure 2 a longitudinal section on line 2—2 of Figure 1.

The spoon 10 is substantially of the conventional shape, with the hook $10^1$ fixed to it in the usual manner. In the center of its forward end, said spoon is formed with a shallow cavity 11 extending inwardly from its concaved surface and whose forward wall $11^1$ forms a flange which is provided centrally with a circular orifice $11^2$. This cavity serves as a socket for a member 12, which, according to the present embodiment, comprises a cylindrical stem $12^1$ made of strong metal or other suitable material and is adapted to swivel in the orifice $11^2$. The inner end of said stem projects into the cavity 11 and is formed with a head or bead $12^2$ which serves to couple said member permanently to the spoon. The outer end of said stem is formed with an eyelet $12^3$ for the attachment of the line L or leader $L^1$. Being thus made an integral part of the spoon, the possibility of the swivel member becoming loose is practically eliminated.

While the idea of providing a trolling spoon with a built-in swivel for the attachment of the line appears to be quite simple, yet, to my knowledge, such spoons have not been known. They are of great utility and highly appreciated by the fisherman, as they dispense with the necessity of employing extra parts or materials, save time and cost and effectively eliminate entanglement of the line.

Since the construction of my device may be modified in various ways without departing from the principle of my invention, I do not wish to restrict myself to the details herein described and shown.

What I claim is:

1. A trolling spoon of concave formation having a depression at its forward end providing a socket, having a forward wall with an opening therein, a member projecting through the opening and capable of swiveling therein, and means on said member for permanently coupling it to said spoon and positioned in said depression, said member having means thereon for the attachment to a line or leader.

2. A trolling spoon of concave formation provided with a recess in its concave wall constituting a socket having a wall at the forward edge of the spoon, said wall having a circular opening therein, a cylindrical stem projecting into said socket through said opening and capable of swivelling therein, said stem having a stop at its inner end positioned in the recess to permanently retain it in said socket, and an eyelet at its outer end for the attachment of the line or leader thereto.

WILLIAM SCHMITZ.